(12) United States Patent
Sharma et al.

(10) Patent No.: US 10,931,496 B2
(45) Date of Patent: Feb. 23, 2021

(54) UPLINK MEASUREMENTS FOR WIRELESS SYSTEMS

(71) Applicant: Parallel Wireless, Inc., Nashua, NH (US)

(72) Inventors: Ajay Sharma, Pune (IN); Somasekhar Pemmasani, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/848,744

(22) Filed: Apr. 14, 2020

(65) Prior Publication Data

US 2020/0244497 A1 Jul. 30, 2020

Related U.S. Application Data

(63) Continuation of application No. 16/378,850, filed on Apr. 9, 2019, now Pat. No. 10,623,226, which is a continuation of application No. 15/484,121, filed on Apr. 10, 2017, now Pat. No. 10,257,008.

(60) Provisional application No. 62/320,472, filed on Apr. 9, 2016.

(51) Int. Cl.
| | |
|---|---|
| *H01L 27/26* | (2006.01) |
| *H04L 27/26* | (2006.01) |
| *H04J 11/00* | (2006.01) |
| *H04L 25/02* | (2006.01) |
| *H04W 72/12* | (2009.01) |
| *H04L 5/00* | (2006.01) |

(52) U.S. Cl.
CPC .......... *H04L 27/265* (2013.01); *H04J 11/005* (2013.01); *H04L 25/022* (2013.01); *H04L 25/0224* (2013.01); *H04W 72/1231* (2013.01); *H04L 5/0051* (2013.01)

(58) Field of Classification Search
CPC . H04L 27/265; H04L 25/022; H04L 25/0224; H04L 5/0051; H04J 11/005; H04W 72/1231
See application file for complete search history.

(56) References Cited

U.S. PATENT DOCUMENTS

| | | | | |
|---|---|---|---|---|
| 2011/0319084 A1* | 12/2011 | Meshkati | ............. | H04B 17/345 455/436 |
| 2013/0114451 A1* | 5/2013 | Al-Dhahir | ............ | H04B 7/0854 370/252 |
| 2016/0119071 A1* | 4/2016 | Sagong | ................. | H04L 5/0051 455/452.1 |
| 2016/0173152 A1* | 6/2016 | Rahman | ............... | H04B 1/1027 455/63.1 |

(Continued)

*Primary Examiner* — Jae Y Lee
(74) *Attorney, Agent, or Firm* — Michael Y. Saji; David W. Rouille (57) ABSTRACT

A method for measuring channel quality in a wireless transceiver is disclosed, comprising: receiving, at a wireless transceiver, an analog signal from a user equipment (UE); converting the analog signal to a plurality of digital samples at an analog to digital converter (ADC); performing a fast Fourier transform (FFT) on the plurality of digital samples to generate frequency domain samples; identifying an uplink demodulation reference signal (DMRS) symbol; performing channel estimation on the DMRS symbol to identify an estimate of channels; creating a noise covariance matrix from the estimate of channels; and deriving an interference measure from the noise covariance matrix.

20 Claims, 3 Drawing Sheets

(56) References Cited

U.S. PATENT DOCUMENTS

2017/0202005 A1* 7/2017 Madan .............. H04W 72/1231

* cited by examiner

UPLINK MEASUREMENTS FOR WIRELESS SYSTEMS

CROSS-REFERENCE TO RELATED APPLICATIONS

This application is a continuation of, and claims the benefit of priority under 35 U.S.C. § 120 of, U.S. patent application Ser. No. 16/378,850, titled "Uplink Measurements for Wireless Systems," and filed Apr. 9, 2019, which itself is a continuation of, and claims the benefit of priority under 35 U.S.C. § 120 of, U.S. patent application Ser. No. 15/484,121, titled "Uplink Measurements for Wireless Systems," and filed Apr. 10, 2017, which itself claims the benefit under 35 U.S.C. § 119(e) of U.S. Provisional Patent Application No. 62/320,472, filed Apr. 9, 2016, and entitled "Uplink Measurements for LTE 4G Systems," each of which is hereby incorporated by reference in its entirety for all purposes. Additionally, U.S. Pat. App. Pub. Nos. US20140086120, US20140092765, US20140133456, US20150045063, and US20150078167 are hereby incorporated by reference in their entirety for all purposes.

BACKGROUND

In LTE 4G systems, uplink measurements such as Interference per Resource Block (RB), Noise per RB, Thermal Noise power and Interference Power hold significant value for the performance of the overall uplink system behavior. These measurement values are calibrated and passed over to higher layers, which can assist with the scheduling of RB's and modulation rate etc. These values also assist the major decision takings such as for inter cell interference co-ordination (ICIC), handover etc.

In Long Term Evolution (LTE/LTE-A), physical uplink shared channel (PUSCH) is used to transmit the uplink data from UE (user equipment) along with control information. PUSCH uses DMRS to help the receiver to estimate channel and equalize the received data. The DMRS also has a major significance in terms of deriving various major measurements. The significance of the measurement values is to assist with the scheduling of the RB in order to enhance the user data decoding and the overall system performance.

SUMMARY

Systems and methods for uplink measurements in wireless systems are disclosed.

In one embodiment, a method for measuring channel quality in a Long Term Evolution (LTE) transceiver is disclosed, comprising: receiving, at a Long Term Evolution (LTE) wireless transceiver, an analog signal from a user equipment (UE); converting the analog signal to a plurality of digital samples at an analog to digital converter (ADC); performing a fast Fourier transform (FFT) on the plurality of digital samples to generate frequency domain samples; identifying an uplink demodulation reference signal (DMRS) symbol; performing channel estimation on the DMRS symbol to identify an estimate of channels; creating a noise covariance matrix from the estimate of channels; and deriving an interference measure from the noise covariance matrix.

The LTE wireless transceiver may be an LTE or LTE-A eNodeB, and the analog signal may be a physical uplink shared channel (PUSCH). The interference measure may be one of: interference per resource block; noise per resource block; thermal noise power; interference power; noise plus interference per resource block; or noise power per resource block. The interference measure may be interference per resource block, derived according to the equation found herein. The interference measure may be noise plus interference per resource block, derived according to the equation found herein. The method may further comprise performing inter cell interference coordination with a second wireless transceiver using the interference measure. The method may further comprise adjusting a handover threshold based on the interference measure. The method may further comprise transmitting the interference measure to a coordination server in an operator core network and receiving a configuration instruction from the coordination server based on the interference measure. The method may further comprise scheduling data transmissions based on the interference measure. The method may further comprise sending the interference measure to a scheduler. The method may further comprise setting a modulation control scheme (MCS) for the UE based on the interference measure.

In another embodiment, an uplink receiver for a wireless base station is disclosed, comprising: an analog to digital conversion module, for converting a received analog signal to a plurality of digital samples; a fast Fourier transform (FFT) module for performing FFT on the plurality of digital samples to generate frequency domain samples; an uplink demodulation reference signal (DMRS) identification module for identifying a DMRS symbol from the frequency domain samples; and an uplink signal strength measurement module, coupled to the uplink DMRS identification module, configured to perform channel estimation on the DMRS symbol to identify an estimate of channels, create a noise covariance matrix from the estimate of channels, and derive an interference measure from the noise covariance matrix.

The wireless base station may be an eNodeB, and the analog signal may be a physical uplink shared channel (PUSCH) received from a user equipment (UE). The interference measure may be one of: interference per resource block; noise per resource block; thermal noise power; interference power; noise plus interference per resource block; or noise power per resource block. The interference measure may be interference per resource block, derived according to the equation found herein. The interference measure may be noise plus interference per resource block, derived according to the equation found herein. The uplink receiver may be further configured to perform inter cell interference coordination with a second wireless transceiver using the interference measure. The uplink receiver may be further configured to adjust a handover threshold based on the interference measure. The uplink receiver may be further configured to schedule data transmissions based on the interference measure. The uplink receiver may be further configured to send the interference measure to a scheduler. The uplink receiver may be further configured to set a modulation control scheme (MCS) for the UE based on the interference measure. The uplink receiver may further comprise a self-organizing network (SON) module in communication with a coordination server in an operator core network, the SON module configured to transmit the interference module to the coordination server.

DETAILED DESCRIPTION

This disclosure focuses on the computation of certain measurement values derived from the uplink demodulation reference signal (DMRS) via the computation of a noise covariance matrix. We derive the expressions for the measurements considering a two-antenna system. A description of the uplink sub-frame along with a block level diagram, and a basic system module of a 4G LTE system in accordance with some embodiments, are provided. Uplink measurements and their derivation and computation are disclosed. The paper mainly focuses on the derivation and computation of the following measurements: Channel Estimation Computation; Noise Covariance Matrix Computation; Noise per RB; Interference per RB; Thermal Noise Power; System Model; and Uplink sub-frame.

The measurements computed in this paper have been supported over PSC 913x processors for baseband LTE Pico/Femto systems. The measurement results are taken by FAPI and sent to L2 in the vendor-specific part of the SUBFRAME.indication message, in the following structure. The results show a relatively accurate computations using the equations provided in this paper.

The following references are incorporated herein in their entirety for all purposes: Saurabh Shandilya, Ajay Sharma, Gopikrishna Charipadi Digital Networking, Freescale Semiconductor. Noida, Noida, India: A Low Complexity SINR Computation for 4G Data Channel In: IEEE ICACCS 2015, 5-7 Jan. (2015); Wang, Y., Zheng, A., Zhang, J., Yang, D.: A Novel Channel Estimation Algorithm for Sounding Reference Signal in LTE uplink Transmission. In: IEEE Conference on Communications Technology and Applications, December 7, pp. 412-415 (2009); Hou, X., Zhang, Z., Kayama, H.: DMRS Design and Channel Estimation for LTE_Advanced MIMO uplink, July 25 (2010); S Sesia, I Toufik, M Baker. LTE the UMTS Long Term Evolution; 3GPP TS 36.141: Evolved Universal Terrestrial Radio Access (E-UTRA); Base Station (BS) conformance testing, V10.10.0 (2013-03), Section 6.5.1.

Figure 1:
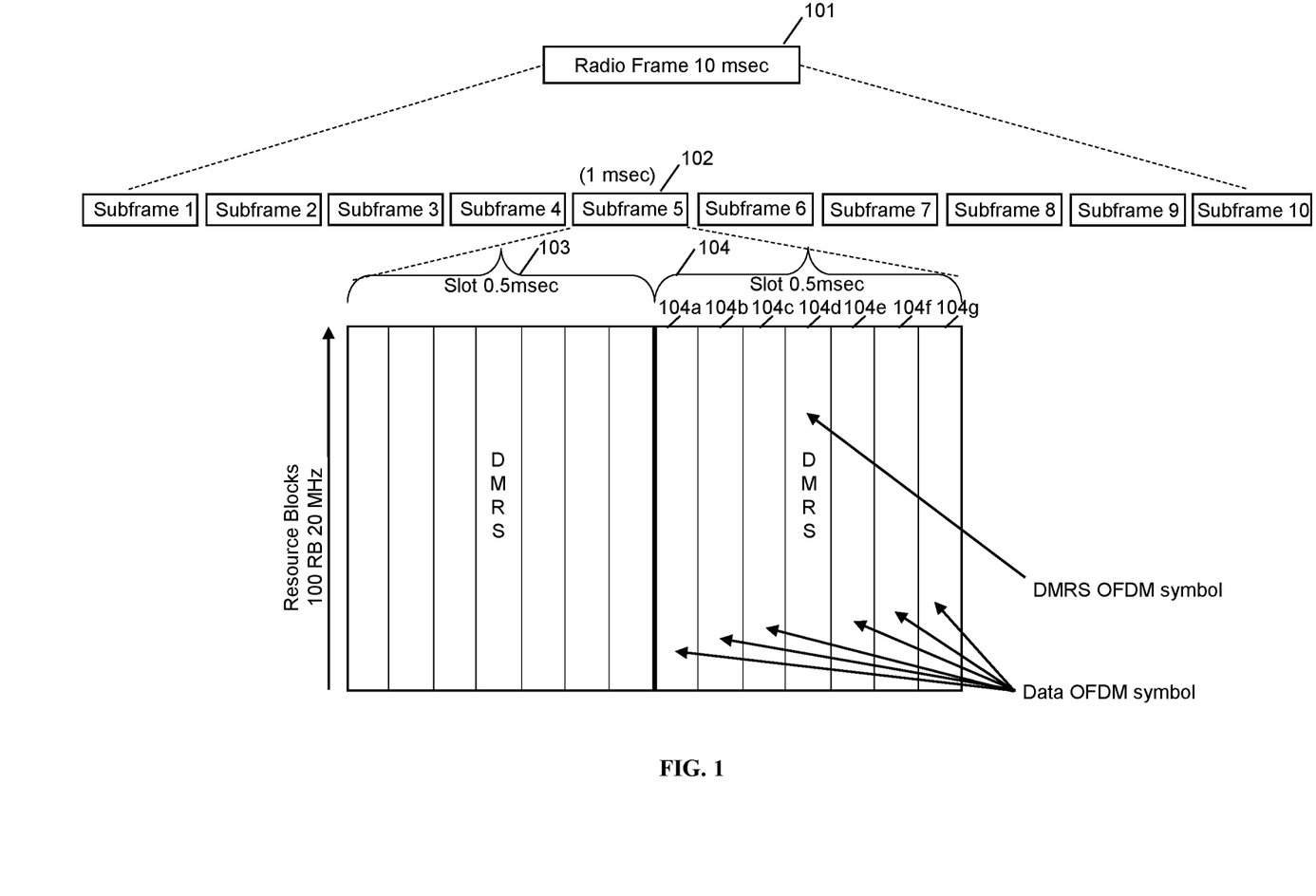
FIG. 1 is a schematic diagram of an uplink subframe, in accordance with some embodiments.

FIG. 1 is a schematic diagram of an LTE uplink subframe, in accordance with some embodiments. A single radio frame 101 is 10 msec in duration. A single uplink sub-frame of 1 msec 102 includes two slots of 0.5 msec each, 103 and 104. Each slot contains 7 OFDM symbols 104a-104g in the case of normal cyclic prefix, or 6 OFDM symbols in the case of extended cyclic prefix. Considering the case of normal cyclic prefix in FIG. 1, the DMRS OFDM symbol 104d is placed at the 4th OFDM symbol of every slot. OFDM symbols 104a, 104b, 104c, 104e, 104f, 104g are mainly considered as the Data OFDM symbols of each slot.

DMRS for PUSCH in the frequency domain will be mapped to the same set of physical resource blocks (PRB) used for the corresponding physical uplink shared channel (PUSCH) transmission with the same length expressed by the number of sub-carriers. DMRS utilizes Zadoff-Chu sequence as the bases for reference signal generation. Zadoff-Chu possess a unique property that its cyclic shifted versions of its own sequence are considered orthogonal to one another. Besides this Zadoff-Chu also contains the following useful properties: it has constant amplitude; it has zero circular auto correlation; it has flat frequency domain response; the circular cross-correlation between two Zadoff-Chu sequences is low; and it has constant amplitude provided that the root sequence is a prime number.

Figure 2:
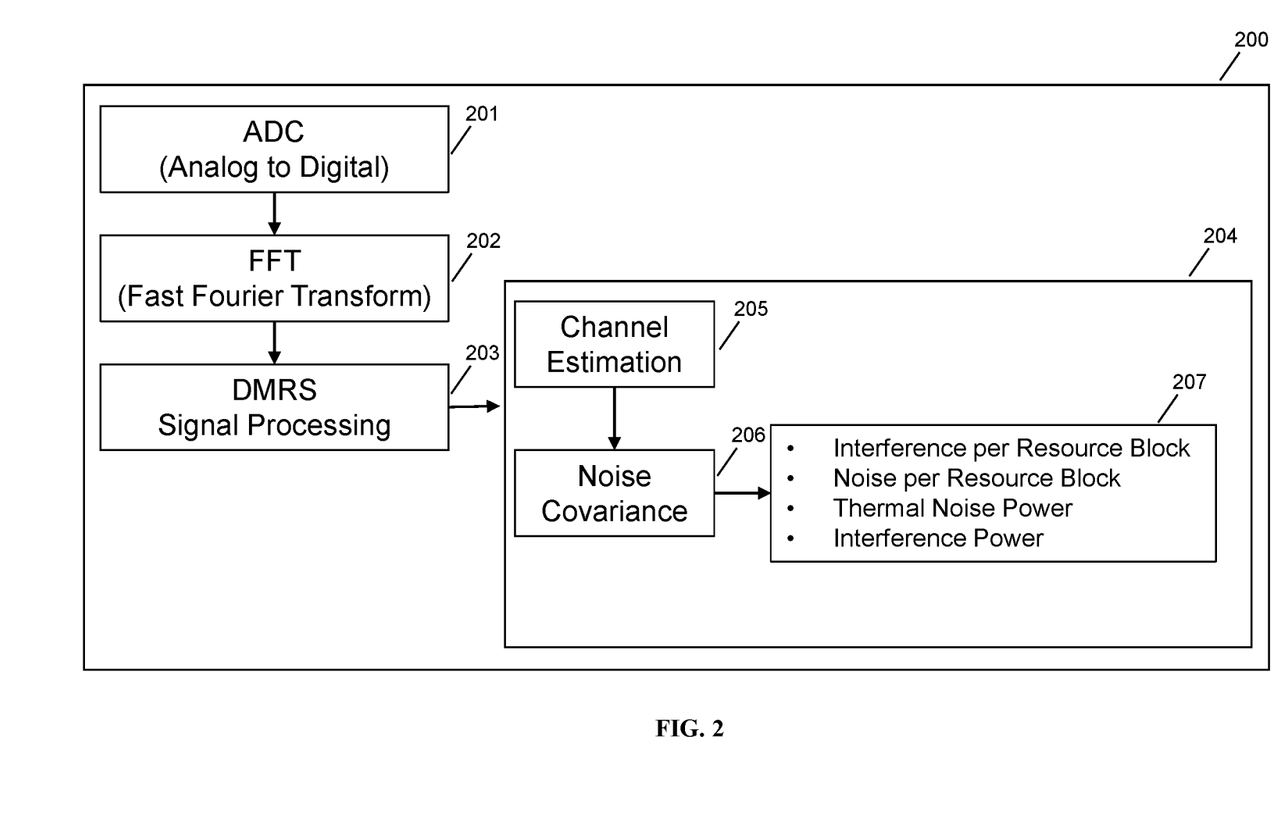
FIG. 2 is a schematic diagram of an uplink receiver block for performing measurements, in accordance with some embodiments.

FIG. 2 is a schematic DIAGRAM of an uplink receiver block for performing measurements, in accordance with some embodiments. A simplified uplink receiver block of a LTE system capturing the measurement block is shown in FIG. 2. The block schematically shows the processing entities, which may be implemented as software or hardware modules. ADC (Analogue to Digital Convertor) 201 captures the samples and processes them into digital level. The samples are then passed to the FFT (Fast Fourier Transform) 202. The FFT transforms the signal from its original domain, being the time domain, into the frequency domain. The processing from ADC to FFT happens on the OFDM symbol bases. Once the DMRS OFDM symbol has been processed via the ADC to the FFT it is passed down to the DMRS signal processing block 203. Identification of the DMRS symbol may be performed within the DMRS signal processing block 203, in some embodiments. Once the DMRS symbol is identified, it is passed to processing block 204.

The signal processing block 204 first computes the channel estimates via the channel estimate at block 205. Next, the noise covariance matrix is computed at block 206 from the channel estimates as explained in section III. The Noise covariance matrix is then utilized to derive several measurements at block 207.

Although there are many ways to compute the measurements values described herein, we explain how Noise Covariance Matrix is computed via the Channel Estimates and correspondingly how each measurement values is derived. The measurements are all based on the Noise Covariance Matrix computed per RB. The computation of Noise Covariance Matrix is performed via the channel estimates which is obtained from the DMRS signal after the FFT as seen in FIG. 2 on OFDM symbols no 4 of each slot per sub frame.

Channel Estimations Computation

A raw channel estimate is first computed as the product of the received samples after FFT and the conjugate of the DMRS sequence. The DMRS sequence is used as a known sequence to create a matched filter. (The principles described herein could be used in conjunction with another radio access technology or modulation technology, such as a 3G WCDMA signal, using the principle of using a known signal to generate a matched filter, in the way that a received LTE signal herein is multiplied with the conjugate of the DMRS sequence, to generate a correlation receiver that integrates energy received in that period.)

$$h_{raw}^{a,s,sc} = y_{dmrs\ ofdm\ symbol}^{a,s,sc} * \overline{DMRS}^{s,sc}$$

The parameters here are:
$h_{raw}^{a,s,sc}$: Raw Channel Estimates
$y_{dmrs\ ofdm\ symbol}^{a,s,sc}$: Received sample after FFT
$\overline{DMRS}^{s,sc}$: DMRS sequence
a: antenna
s: slot
sc: subcarrier Then for each subcarrier, the raw channel estimate is filtered with the channel estimate from surrounding subcarriers. The purpose of filtering is to improve channel estimate accuracy by filtering out the noise.

$$h^{a,s,sc} = \frac{1}{L}\sum_{i=0}^{L-1} c_i * h_{raw}^{a,s,sc-\frac{L-1}{2}+i}$$

The parameters here are:
$h^{a,s,sc}$: Actual Channel Estimates
$h_{raw}^{a,s,sc}$: Raw Channel Estimates
$c_i$: filter tap
L: number of filter taps
a: antenna
s: slot
sc: subcarrier

Noise Covariance Matrix Computation

The noise is computed as the difference between the final channel estimate and the raw channel estimate:

$$N^{a,s,sc} = h^{a,s,sc} - h_{raw}^{a,s,sc}$$

$$Cn_{i,j}^{s,p} = 1/12 \Sigma_{ac=12p}^{12p+11} N^{i,s,sc} * \overline{N}^{j,s,sc}$$

Cn: Noise Covariance Matrix
i & j: RX antenna indices
p: Physical Resource Block index.
The noise covariance per RB computed is as below:

$$Cn = \begin{pmatrix} C_{1,1} & C_{1,2} \\ C_{2,1} & C_{2,2} \end{pmatrix}$$

$C_{1,1}$: Noise+Interference for ant1

$$C_{1,1} = |h_1|^2 I + N \qquad \text{eq 1}$$

$C_{1,2}$: Intereference
$C_{2,1}$: Intereference conjugate of $C_{1,2}$
$C_{2,2}$: Noise+Interference for ant2

$$C_{2,2} = |h_2|^2 I + N \qquad \text{eq 2}$$

Received Total RB Power (RTRP)

Received Signal Strength Indicator (RSSI) is the average of $I^2+Q^2$ on FFT output of DMRS OFDM symbol of the DMRS OFDM symbol.

Example 1

Considering 1 RB allocation for a user for a two antenna system the RSSI is the average over the Diagonal element of the Noise Covariance Matrix over DMRS symbols computed.

$$Cn = \begin{pmatrix} C_{1,1} & C_{1,2} \\ C_{2,1} & C_{2,2} \end{pmatrix}$$

$$RSSI = \frac{1}{2}[C_{1,1} + C_{2,2}]$$

Example 2

Considering 10 RB allocation for a user for a two antenna system the RSSI is the average over the Diagonal element of the Noise Covariance Matrix over DMRS symbols computed.

$$Cn = \frac{1}{10} * \frac{1}{2} \sum_{RB=1}^{10} \begin{pmatrix} C_{1,1} & C_{1,2} \\ C_{2,1} & C_{2,2} \end{pmatrix}$$

$$RSSI = \frac{1}{2} * \frac{1}{10}([C_{1,1} + C_{2,2}]_{RB1} + [C_{1,1} + C_{2,2}]_{RB2} \ldots [C_{1,1} + C_{2,2}]_{RB10})$$

Thermal Noise Power

Step 1: Interference is computed as the off diagonal power of the noise covariance matrix.
Interference per RB is:

$$IP(p) = \frac{1}{N_{off\_diag} * N_{slot}} \sum_{o=1}^{N_{off\_diag}} \sum_{t=1}^{N_{slot}} |C_{o,t,p}|$$

The parameters here are:
$C_{o,t,p}$: Noise covariance matrix off-diagonal.
Noff_diag: Number of off-diagonal elements in the noise covariance matrix.
Nslot: Number of slots over which the average is done.

Step 2: Received interference power is Noise+Interference per RB. For PUSCH allocations, it is computed in RSP as the average over the Diagonal element of the Noise Covariance Matrix.
Noise+Interference per RB is:

$$NIP(p) = \frac{1}{N_{diag} * N_{slot}} \sum_{d=1}^{N_{diag}} \sum_{t=1}^{N_{slot}} |C_{d,t,p}|$$

The parameters here are:
$C_{d,t,p}$: Noise Covariance Matrix diagonal
Ndiag: Number of diagonal elements in the Noise Covariance Matrix
Nslot: Number of slots over which the average is done
Step 3: Noise power per RB is computed as the difference between noise+interference and interference.
Noise power per RB is:

$$NP(p) = NIP(p) - IP(p)$$

Step 4: Thermal noise power is computed as the sum of noise per RB, over all RBs. Thermal noise power:

$$No = \Sigma_{n=1}^{num\_RB} NP(n)$$

Exemplary Hardware

Figure 3:
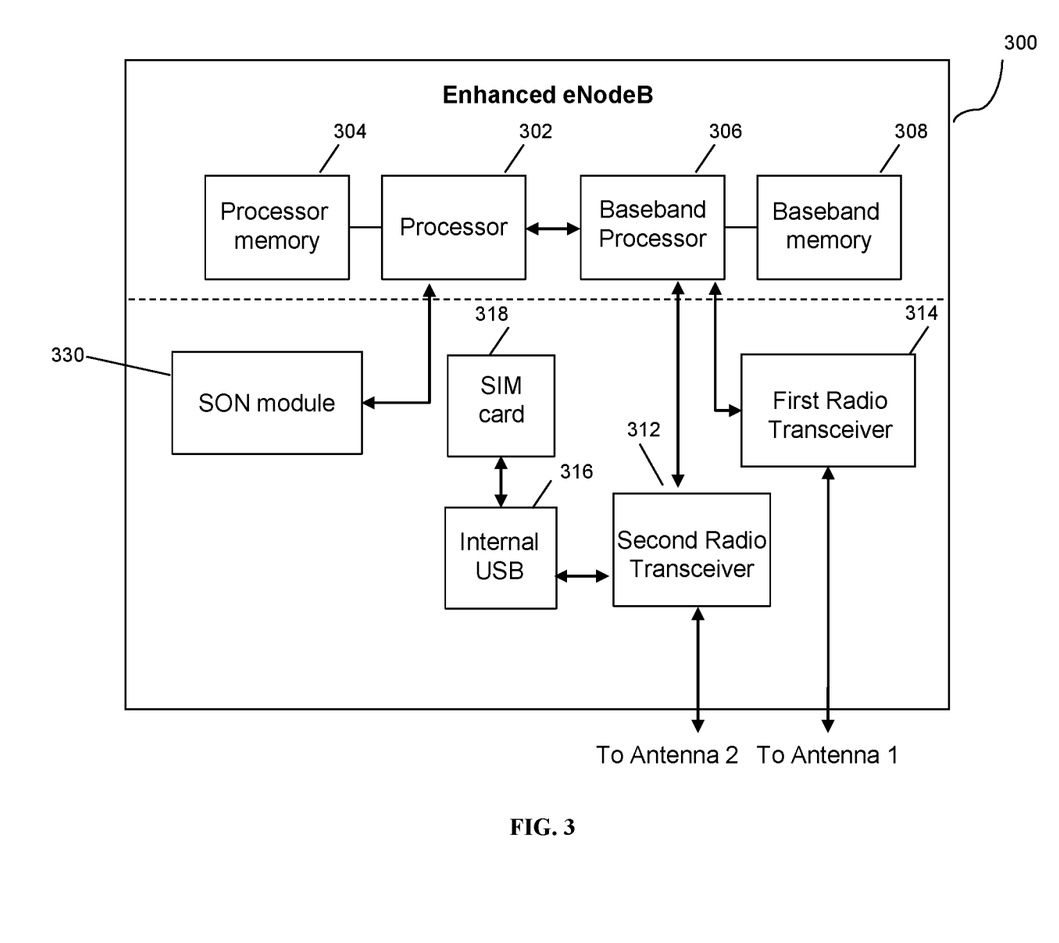
FIG. 3 is a schematic diagram of an enhanced base station, in accordance with some embodiments.

FIG. 3 is a schematic diagram of an enhanced eNodeB, in accordance with some embodiments. Enhanced eNodeB 300 may include processor 302, processor memory 304 in communication with the processor, baseband processor 306, and baseband processor memory 308 in communication with the baseband processor. Enhanced eNodeB 300 may also include first radio transceiver 310 and second radio transceiver 312, internal universal serial bus (USB) port 316, and subscriber information module card (SIM card) 318 coupled to USB port 314. In some embodiments, the second radio transceiver 312 itself may be coupled to USB port 316, and communications from the baseband processor may be passed through USB port 316.

A self-organizing network (SON) module 330 may also be included, which may include a database (not shown), in some embodiments, or which may be in communication with a coordination server (not shown), in some embodiments, or both, in some embodiments. The channel estimations and channel quality measurements, the noise covariance matrices, the noise per RB or channel for any given RB or channel, or any other calculated or received parameters described herein, may be sent via the SON module to the coordination server and used for coordinating transmissions throughout the network at multiple base stations, in some embodiments.

Processor 302 and baseband processor 306 are in communication with one another. Processor 302 may perform routing functions, and may determine if/when a switch in network configuration is needed. Baseband processor 306 may generate and receive radio signals for both radio transceivers 310 and 312, based on instructions from processor 302. In some embodiments, processors 302 and 306 may be on the same physical logic board. In other embodiments, they may be on separate logic boards.

The first radio transceiver 310 may be a radio transceiver capable of providing LTE eNodeB functionality, and may be capable of higher power and multi-channel OFDMA. The second radio transceiver 312 may be a radio transceiver capable of providing LTE UE functionality. Both transceivers 310 and 312 are capable of receiving and transmitting on one or more LTE bands. In some embodiments, either or both of transceivers 310 and 312 may be capable of providing both LTE eNodeB and LTE UE functionality. Transceiver 310 may be coupled to processor 302 via a Peripheral Component Interconnect-Express (PCI-E) bus, and/or via a daughtercard. Transceiver 310 may have its L1 (PHY), L2 (MAC), and other layers implemented using software modules that are configured to run on processor 302, as described herein.

Transceiver 312 may be for providing LTE UE functionality, in effect emulating a user equipment, it may be connected via the same or different PCI-E bus, or by a USB bus, and may also be coupled to SIM card 318. SIM card 318 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

Alternatively, transceiver 312 may be another radio access technology (RAT) radio, such as a 2G, 3G, 3G, 5G, or Wi-Fi radio. Transceivers 310 and 312 may have different RATs or the same RAT. As each RAT and as each radio has its own PHY, the concepts and methods described herein could be used for 2G, 3G, 3G, 5G, or Wi-Fi PHY and MAC layer error messaging, or a combination of multiple RAT layer error messaging modules.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 310 and 312, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 302 for reconfiguration.

Other elements and/or modules may also be included, such as a home eNodeB, a local gateway (LGW), or another module. Additional radio amplifiers, radio transceivers and/or wired network connections may also be included.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 310 and 312. Baseband processor 306 may use memory 308 to perform these tasks. In some embodiments, the steps described herein, including channel estimation and channel measurement, may be performed at the processor 302, or the baseband processor 306, or a combination of both. In some embodiments, the processor 302 may receive PHY samples from the baseband processor 306 and perform the majority of the steps herein, such as identifying resource blocks and OFDM symbols, and calculating noise covariance matrices.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the methods described assume a single-in, single-output (SISO) system, the techniques described can also be extended to multiple-in, multiple-out (MIMO) systems.

In some embodiments, the methods described can be used with 2G, 3G, 3G, 5G, Wi-Fi, or multi-RAT base stations or access points. In some embodiments, the methods described could be used in a UE as well as femto, nodeB, eNodeB, metro, or macro, as long as an API is used for communication between the PHY and the MAC layers.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, while certain methods are understood to utilize FAPI, other methods and aspects do not require the LTE Small Cell Forum FAPI or any 3GPP Release.

In some embodiments, the software needed for implementing the methods and procedures described herein may be implemented in a high level procedural or an object-oriented language such as C, C++, C#, Python, or Java. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for measuring channel quality in a wireless transceiver, comprising:
   receiving, at a wireless transceiver, an analog signal from a user equipment (UE);
   converting the analog signal to a plurality of digital samples at an analog to digital converter (ADC);
   performing a fast Fourier transform (FFT) on the plurality of digital samples to generate frequency domain samples;
   identifying an uplink demodulation reference signal (DMRS) symbol;
   performing channel estimation on the DMRS symbol to identify an estimate of channels;
   creating a noise covariance matrix from the estimate of channels;
   deriving an interference measure from the noise covariance matrix; and
   using the noise covariance matrix to provide error messaging at one or both of a Physical (PHY) and a Media Access Control (MAC) layer.

2. The method of claim 1, wherein the interference measure comprises noise plus interference per resource block, derived as an average of summation of diagonal matrix elements over a plurality of slots and a plurality of antennas, and
   wherein the diagonal matrix elements are noise plus interference components.

3. The method of claim 1, wherein the wireless transceiver is an LTE or LTE-A eNodeB, and the analog signal is a physical uplink shared channel (PUSCH).

4. The method of claim 1, wherein the interference measure further comprises one of: interference per resource block; noise per resource block; thermal noise power; interference power; noise plus interference per resource block; or noise power per resource block.

5. The method of claim 1, further comprising obtaining a second interference measure that is interference per resource block, derived according to an equation $$IP(p) = \frac{1}{N_{off\_diag} * N_{slot}} \sum_{o=1}^{N_{off\_diag}} \sum_{t=1}^{N_{slot}} |C_{o,t,p}|,$$

where
$C_{o,t,p}$ is a noise covariance matrix off-diagonal;

Noff_diag is a number of off-diagonal elements in a noise covariance matrix; and Nslot is a number of slots over which an average is computed.

6. The method of claim 1, wherein the interference measure is noise plus interference per resource block, derived according to an equation $$NIP(p) = \frac{1}{N_{diag} * N_{slot}} \sum_{d=1}^{Ndiag} \sum_{t=1}^{Nslot} |C_{d,t,p}|,$$

where $C_{d,t,p}$ is a Noise Covariance Matrix diagonal;

Ndiag is a number of diagonal elements in the Noise Covariance Matrix; and

Nslot is a number of slots over which an average is performed.

7. The method of claim 1, further comprising performing inter cell interference coordination with a second wireless transceiver using the interference measure.

8. The method of claim 1, further comprising transmitting the interference measure to a coordination server in an operator core network and receiving a configuration instruction from the coordination server based on the interference measure.

9. The method of claim 1, further comprising scheduling data transmissions based on the interference measure, adjusting a handover threshold based on the interference measure, sending the interference measure to a scheduler, or setting a modulation control scheme (MCS) for the UE based on the interference measure.

10. The method of claim 1, wherein the receiving at a wireless transceiver comprises receiving at a 2G, 3G, 4G, 5G or Wi-Fi radio transceiver.

11. The method of claim 1, further comprising transmitting the interference measure from a self-organizing network (SON) controller to a coordination server in an operator core network.

12. The method of claim 1 further comprising using an API for communication between the PHY and MAC layers.

13. The method of claim 1 further comprising using a combination of multiple Radio Access Technology (RAT) layer error messaging modules.

14. The method of claim 1, further comprising sending messages between the PHY layer and the MAC layer to coordinate error handling.

15. The method of claim 1, further comprising splitting error handling among the PHY layer and MAC layer.

16. A system for measuring channel quality, comprising:

a wireless transceiver;

wherein the wireless transceiver is configured to perform steps comprising:

receiving an analog signal from the UE and converts the analog signal to a plurality of digital samples at an analog to digital converter (ADC);

performing a fast Fourier transform (FFT) on the plurality of digital samples to generate frequency domain samples;

identifying an uplink demodulation reference signal (DMRS) symbol;

performing channel estimation on the DMRS symbol to identify an estimate of channels;

creating a noise covariance matrix from the estimate of channels;

deriving an interference measure from the noise covariance matrix; and using the noise covariance matrix to provide Physical (PHY) and Media Access Control (MAC) layer error messaging, wherein the interference measure comprises noise plus interference per resource block, derived as an average of summation of diagonal matrix elements over a plurality of slots and a plurality of antennas, and wherein the diagonal matrix elements are noise plus interference components.

17. The system of claim 16, wherein the wireless transceiver uses an API for communication between the PHY and MAC layers.

18. The system of claim 16, wherein the wireless transceiver comprises a 2G, 3G, 4G, 5G or Wi-Fi radio transceiver.

19. The system of claim 16, further comprising sending messages between the PHY layer and the MAC layer to coordinate error handling.

20. The system of claim 16, further comprising splitting error handling among the PHY layer and MAC layer.

* * * * *